United States Patent [19]

Clark

[11] Patent Number: 4,624,314

[45] Date of Patent: Nov. 25, 1986

[54] MODIFIED WATERFLOOD TECHNIQUE FOR ENHANCED HYDROCARBON RECOVERY FROM ARGILLACEOUS SUBTERRANEAN RESERVOIRS

[75] Inventor: Greig J. Clark, Calgary, Canada

[73] Assignee: Amerigo Technology Limited, Alberta, Canada

[21] Appl. No.: 740,243

[22] Filed: Jun. 3, 1985

[30] Foreign Application Priority Data

Apr. 29, 1985 [CA] Canada .................. 480293

[51] Int. Cl.$^4$ ............................................ E21B 43/27
[52] U.S. Cl. .................................... 166/271; 166/273; 166/274
[58] Field of Search ............... 166/270, 271, 273, 274, 166/305.1, 307; 252/8.55 C

[56] References Cited

U.S. PATENT DOCUMENTS

| | | | |
|---|---|---|---|
| 2,053,285 | 9/1936 | Grebe ........................ | 166/307 X |
| 2,358,562 | 9/1944 | Dismukes ................... | 252/8.55 C |
| 2,425,415 | 8/1947 | Bond et al. ................. | 166/307 |
| 2,866,507 | 12/1958 | Bond et al. . | |
| 3,122,204 | 2/1964 | Oakes ........................ | 166/307 |
| 3,185,634 | 5/1965 | Craig et al. . | |
| 3,196,944 | 7/1965 | Bernard et al. . | |
| 3,273,643 | 10/1966 | Billings et al. . | |
| 3,297,084 | 1/1967 | Gogarty et al. ............ | 166/274 X |
| 3,318,379 | 5/1967 | Bond et al. . | |
| 3,335,794 | 8/1967 | Bond . | |
| 3,342,256 | 9/1967 | Bernard et al. . | |
| 3,369,601 | 2/1968 | Bond et al. . | |
| 3,376,924 | 4/1968 | Felsenthal et al. . | |
| 3,393,738 | 7/1968 | Bernard et al. . | |
| 3,448,807 | 6/1969 | Strickland, Jr. ........... | 166/256 |
| 3,464,491 | 9/1969 | Froning ..................... | 166/261 |
| 3,529,668 | 9/1970 | Bernard .................... | 166/275 |
| 3,530,940 | 9/1970 | Dauben et al. ........... | 166/305.1 |
| 3,532,165 | 10/1970 | Raifsnider ................ | 166/270 |
| 3,550,686 | 12/1970 | Knox ........................ | 166/307 |
| 3,572,440 | 3/1971 | Hutchison et al. ........ | 166/311 |
| 3,603,398 | 9/1971 | Hutchison et al. ........ | 166/305 |
| 3,612,179 | 10/1971 | Anderson et al. ......... | 166/281 |
| 3,616,852 | 11/1971 | Allen ........................ | 166/271 |
| 3,648,772 | 3/1972 | Earlougher, Jr. .......... | 166/273 |
| 3,722,590 | 5/1973 | Froning et al. ........... | 166/273 |
| 3,799,266 | 3/1974 | Kiel ........................... | 166/307 X |
| 3,831,679 | 8/1974 | Presley et al. ............. | 166/307 |
| 3,937,283 | 2/1976 | Blauer et al. .............. | 166/307 |
| 4,044,833 | 8/1977 | Volz ........................... | 166/307 |
| 4,068,717 | 1/1978 | Needham ................... | 166/272 |
| 4,086,964 | 5/1978 | Dilgren et al. ............ | 166/272 |
| 4,088,190 | 5/1978 | Fischer et al. ............ | 166/274 |
| 4,108,782 | 8/1978 | Thompson ................. | 252/8.55 |
| 4,113,011 | 9/1978 | Bernard et al. ........... | 166/273 |
| 4,113,631 | 9/1978 | Thompson ................. | 252/8.55 |
| 4,156,464 | 5/1979 | Hussin ...................... | 166/308 |
| 4,161,217 | 7/1979 | Dilgren et al. ............ | 166/252 |
| 4,237,975 | 12/1980 | Scherubel .................. | 166/281 |
| 4,300,634 | 11/1981 | Clampitt ................... | 166/272 |
| 4,323,741 | 11/1980 | Richardson et al. ...... | 166/281 |
| 4,433,730 | 2/1984 | Trushenski ................ | 166/274 |
| 4,436,156 | 3/1984 | Fredrickson .............. | 166/307 |
| 4,453,596 | 6/1984 | Conway et al. ........... | 166/278 |
| 4,536,305 | 8/1985 | Borchardt et al. ........ | 252/8.55 C X |

FOREIGN PATENT DOCUMENTS

| | | | |
|---|---|---|---|
| 741240 | 8/1966 | Canada ...................... | 31/10 |
| 929103 | 6/1973 | Canada . | |
| 951103 | 7/1974 | Canada . | |
| 1003200 | 1/1977 | Canada . | |
| 1031153 | 5/1978 | Canada ...................... | 31/14 |
| 1056590 | 6/1979 | Canada ...................... | 31/14 |
| 1089212 | 11/1980 | Canada ...................... | 31/14 |
| 1092796 | 1/1981 | Canada ...................... | 31/14 |
| 1140326 | 2/1983 | Canada . | |

OTHER PUBLICATIONS

The Reservoir Engineering Aspects of Waterflooding, Forrest F. Craig, Jr., Monograph vol. 3 of The Henry L. Doherty Series, Chapter 4, 1971.

*Primary Examiner*—George A. Suchfield
*Attorney, Agent, or Firm*—Merchant, Gould, Smith, Edell, Welter & Schmidt

[57] ABSTRACT

A method of recovering hydrocarbon from an argillaceous subterranean rock formation involving the flooding of the formation with an aqueous fluid to displace the hydrocarbon from the formation. The method involves first subjecting the formation to an acid stimulation treatment by injecting a strongly acidic solution to dissolve acid soluble pore clogging materials, although this first step can be omitted, if desired. The formation is then treated with a solution containing an acid, a surfactant and a clay stabilizing agent. The concentration of the treatment solution is initially quite high but is gradually reduced until a certain threshold concentration is reached, after which a treatment solution having this threshold concentration is continuously injected into the formation to displace the hydrocarbon. The ingredients of the treatment solution exhibit a synergistic effect in maintaining a desirable rock permeability and a favorable mobility ratio between the treatment solution and the displaced hydrocarbons.

19 Claims, No Drawings

MODIFIED WATERFLOOD TECHNIQUE FOR ENHANCED HYDROCARBON RECOVERY FROM ARGILLACEOUS SUBTERRANEAN RESERVOIRS

BACKGROUND OF THE INVENTION

1. Field of the Invention

This invention relates to waterflooding procedures used for increasing the amount of of oil which can be obtained from oil bearing subterranean rock formations containing water sensitive clays (argillaceous rock formations).

Water sensitive (hydratable) clays are found in many rock formations, e.g. sandstones and carbonate formations, and are generally of the smectite group, e.g. montmorillonite, beidelonite, nontronite, saponite, hectorite and sauconite.

2. Discussion of the Prior Art

Enhanced hydrocarbon (oil) recovery techniques (sometimes called secondary or tertiary recovery techniques) are used to recover additional hydrocarbons from subterranean rock strata once the hydrocarbons no longer flow from the strata under their own pressure in commercially significant quantities. The signal most commonly used method of enhanced recovery is water flooding. In this process water is injected into the formation through one or more injection or input wells in order to displace hydrocarbons from the reservoir and the displaced hydrocarbons are recovered from one or more production wells drilled into the same formation at suitable distances from the injection wells. A good discussion of the principles of such waterflooding practices can be found in a monograph of the Society of Petroleum Engineers section of the American Institute of Mining Engineering entitled "The Reservoir Engineering Aspects of Waterflooding" by F. F. Craig, and a publication entitled "Enhanced Recovery of Residual and Heavy Oils", Second Edition (1980) Edited by M. M. Schumacher and published by Noyes Data Corporation, the disclosures of which are incorporated herein by reference.

The water required for such techniques is usually taken from a readily available natural source such as a river, lake or subterranean formation. In the course of waterflooding it is common practice to treat the waters (which are normally brines) used for injection purposes to prevent plugging of the formation caused by such factors as mineral scales, suspended mineral solids, or bacteria. Normal techniques include chemical or physical treatments to remove certain dissolved cations or anions which may be incompatible with waters native to the reservoir being waterflooded. An example of incompatible dissolved chemical species would be the injection of waters having high sulfate or carbonate concentrations into a reservoir containing in-situ waters rich in calcium, strontium or barium. The potential for forming low solubility salts of calcium carbonate, calcium sulfate, strontium sulfate or barium sulfate under the circumstances must be avoided by chemical treatments to prevent scale disposition and the resulting loss in injectivity that occurs when in-situ scales are formed in the reservoir.

Another frequently used technique involves filtration of suspended matter that may be present in the injection waters. Also, organic materials such as trace hydrocarbons may be present in the injection waters if these waters are obtained from other subterranean aquifers. These hydrocarbons are normally removed by mechanical equipment to prevent their disposition in the reservoir rock thereby preventing alterations of reservoir rock wettability and the ensuing reduction in the relative permeabilities of the reservoir rock to waters.

Another form of treatment of injection waters involves the addition of bactericides to prevent plugging caused by bacterial growth in the injection wellbores or hydrocarbon reservoir. Also removal of dissolved gases such as oxygen (that may have been introduced into the injection waters as a result of other treatment procedures) is frequently practiced to prevent potential corrosion by-products, or oxidation of more soluble chemical species to lower soluble species (i.e. sulfides to sulfates).

In all of the above cases the primary objective is to render the injection waters compatible with in-situ reservoir fluids and prevent damage to the reservoir. As such these methods are not designed to enhance the recovery of hydrocarbons exept in that they ensure optimal rates of water injection by preserving permeability of the reservoir being waterflooded.

To improve further the recovery of hydrocarbons, a number of chemically modified waterflooding procedures have been developed. In the so-called alkaline waterflooding practices, a caustic solution such as sodium or potassium hydroxides or silicates are admixed with the injection waters so that these chemicals combine with fatty acid or hydroxyl-containing species of the reservoir hydrocarbons and are converted to crude detergents or surfactants. These in turn reduce the interfacial forces between the reservoir rock and fluids to promote improved recovery of the hydrocarbons from the reservoir. Unfortunately many reservoirs contain appreciable quantities of native clays which swell when contacted by high pH fluids so that the benefits of interfacial tension lowering using caustic solutions are negated by a loss in rock permeability caused by clay swelling.

Another procedure for augmenting waterflood practices to improve hydrocarbon recovery involves the use of polymers to viscosify (thicken) the injection waters. This method of treatment decreases the disparity in mobility between the displacing phase (injected fluid) and the displaced phase (hydrocarbons) thereby reducing the tendency of water to bypass the hydrocarbons located in the less permeable sectors of the reservoir. Again, the costs associated with adsorption and shear degradation of the polymer within the reservoir, injection problems caused by the highly-viscous fluids, and the physiochemical limitations of many commercially available polymers frequently render the overall process uneconomic.

An important factor in controlling the amount of hydrocarbons (oil) recovered by displacement processes such as normal waterfloods or chemically-modified waterfloods is described by the mobility ratio of the displacing (injected) fluids and the displaced (produced) oil. Current convention defines the mobility ratio (M) as follows:

$$M = \frac{\text{mobility of displacing phase}}{\text{mobility of displaced phase}} = \frac{\frac{Kw}{\mu w}}{\frac{Knw}{\mu nw}} = \frac{Kw}{Knw} \cdot \frac{\mu nw}{\mu w}$$

wherein:

Kw represents the permeability of the formation to the displacing (injected) phase within that portion of the reservoir wetted by this phase;

Knw represents the permeability of the oil saturated portion or the formation to the displaced oil;

$\mu$nw represents the viscosity of the displaced oil (non-wetting phase); and $\mu$w represents the viscosity of the displacing (injected) phase.

It is well known that a reduction of the mobility ratio favours increased hydrocarbon recovery by reducing the amount of fluids which must be injected to recover the oil. By conventional use, mobility ratios of less than unity are termed "favourable," and those greater than unity are "unfavourable". From the above equation it can be shown that either lowering the mobility of the displacing phase or raising the mobility of the displaced phase affords the opportunity to lower the mobility ratio. This expression supports the rationale behind many of the current enhanced oil recovery schemes. For example, in the previously described polymer augmented waterflood process the injected fluids are made more viscous than the displaced fluids. This would have the effect of lowering the mobility ratio and increasing the amount of hydrocarbons recovered. Similarly, in miscible processes such as gas injection schemes the effective viscosity of the hydrocarbons are lowered when the injected gas dissolves in the hydrocarbon phase.

For a more detailed explanation of the many methods and mechanisms of enhanced oil (hydrocarbon) recovery reference is made to "Enhanced Oil Recovery, 1976 & 1984 Editions, published by the National Petroleum Council, Washington, D.C.

While it is clear from the above that numerous attempts have been made to improve waterflood techniques, an entirely satisfactory treatment method has not yet been developed, particularly when the reservoir to be treated contains hydratable clays which are sensitive to differences between connate water and treatment solutions.

SUMMARY OF THE INVENTION

An object of the present invention is to provide a modified waterflooding technique which results in a good recovery of hydrocarbons from subterranean formations, and particularly argillaceous subterranean formations.

Another object of the invention is to provide a modified waterflooding technique which is relatively inexpensive to operate.

The invention involves first increasing the permeability of an argillaceous formation adjacent to the input well by injecting a strongly acidic aqueous solution into the formation. However, if the permeability of the formation is sufficiently high, this step may be omitted. An acidic surfactant solution which contains a clay stabilizing agent is then injected into the well to displace the strongly acidic aqueous solution (if used) and to displace oil from the formation. The acidity of this solution, or more accurately its total ionic concentration, should initially be high but the concentration of the solution is gradually reduced as the injection proceeds until a threshold concentration is reached. This threshold concentration is substantially the lowest concentration of the ingredients of the treatment solution capable of maintaining acceptable permeability and a mobility ratio of about 1.0 or less between the solution being injected and the hydrocarbon being displaced from the formation. Further aqueous acidic surfactant solution containing a clay stabilizing agent and having the threshold concentration is then injected until the modified waterflood process is complete.

DETAILED DESCRIPTION OF THE INVENTION AND PREFERRED EMBODIMENTS

An underlying principle of the present invention is the use of chemically modified aqueous treatment fluids for waterflooding techniques which not only improve or maintain the permeability of the argillaceous subterranean formation but also optimize the mobility ratio previously described while minimizing the use of expensive chemical additives.

The invention normally comprises three distinct steps carried out in sequence, namely an acid stimulation step, a gradual concentration reduction step and a continuous low concentration treatment step.

The acid stimulation step involves the treatment of the argillaceous hydrocarbon-bearing formation adjacent to the injection well bore with a concentrated aqueous acid solution to improve the permeability of the formation by dissolving acid soluble mineral deposits located within the interconnecting pore network of the rock. Occasionally, when the rock is initially sufficiently permeable to permit a suitably high fluid injection rate, the acid stimulation step may be omitted and the process may commence with the concentration reduction step.

When the acid stimulation step is carried out, the particular acid or acid mixture employed should be chosen according to the nature of the formation rock. In many reservoirs the acid soluble permeability restricting minerals are composed of silicaceous mineral "fines" such a clays and feldspars which can only be dissolved by treatment with acid systems which contain hydrofluoric acid. In other reservoirs the permeability reducing agents may be composed of carbonate minerals which can be dissolved using strong acids such as phosphoric, hydrochloric, or combinations of mineral acids and organic acids such as formic or acetic.

Occasionally, other acid compatible additives such as corrosion inhibitors, surfactants, sequesterants, clay stabilizing agents, etc. may be incorporated into the acid stimulation solutions to improve the properties of these systems. This technology is well known to those familiar with the art of well stimulation and is the subject of many patents and reference texts such as the Society of Petroleum Engineers Monograph Vol. 6, entitled, "Acidizing Fundamentals" by B. B. Williams, J. L. Gidley & R. S. Schechter, the disclosure of which is incorporated herein by reference.

By way of example only, a particularly useful stimulation acid system which may be employed is one which contains phosphoric and hydrofluoric acid mixtures as described in copending U.S. patent application No. 440,262 filed on November 1982, which exhibits the unique property of dissolving silicaceous fines while passivating carbonate minerals against attack by acids. The disclosure of the aforesaid application is incorporated herein by reference. The use of this acid thus allows the permeability of certain calcareous-cemented sandstone formations to be improved without risk of damaging the critical region of these formations adjacent to the wellbore(s). The acid system contains phosphoric acid in a concentration range from about 10 to about 30% by weight and a hydrofluoric acid concentration of from about 1 to about 7% by weight. Additionally, this system contains surfactants, corrosion inhibitors, sequesterants and clay-stabilizing reaction products.

The pH of the acid solution should be low enough to achieve the desired increase in permeability and is usually in the range of 1 to 3, preferably 1 to 2.

The amount of acid solution employed in the first step is preferably the minimum amount required to achieve the desired increase in permeability and will be readily apparent to persons skilled in the art.

The gradual concentration reduction step is commenced immediately after the termination of the acid stimulation step and is preferably continuous therewith. This step involves the displacement of the acid stimulation solution into the formation by the injection into the input well bore of a solution containing a relatively strong acid, a surfactant, and clay stabilizing agent. As the injection of the fluid proceeds, the concentration of the acid, and also preferably of the other ingredients, is gradually reduced to a certain minimum or "threshold" concentration. The reduction in concentration may be continuous but, for ease of operation, a step-wise reduction is much preferred.

The reason for the gradual reduction in the concentration is governed by two competing factors. Firstly, it is desirable to make the treatment solution as dilute as possible to reduce the consumption of its costly ingredients. However, the inventor of the present invention has found that a rapid reduction in the acid concentration adversely affects the permeability of argillaceous formations. The reason for this is not precisely known, but it is believed that rapid changes of the electrolytic environment destabilize fluid-sensitive clay minerals or other reservoir components resulting in swelling and pore blockage. If this "electrolytic shock" is not prevented by a gradual reduction of the total ionic concentration, i.e. generally the acid concentration, then the permeability of the reservoir rock can be severely reduced.

The sensitivity of a rock formation to such electrolytic shock can be determined by carrying out tests on core samples using procedures similar to those outlined in the Examples provided below, and the reduction of the acid concentration can then be carried out accordingly. As a general rule, however, the initial acid concentration of the treatment fluid used in the concentration reduction step should preferably be such that the total ionic concentration of the solution is at least 20% that of the acid solution used in the acid stimulation step. Subsequent reductions must, as noted above, be gradual and when stepwise reductions are employed, as many as twelve different acid concentrations may be employed until the threshold concentration is reached. Each solution generally has a concentration between one fifth and one half that of the solution of the preceding step. The amount of solution used in each acidity reduction step can be quite small, e.g. 0.05% or less of the available pore volume in the reservoir being treated, and is usually less than the amount of solution used in the acid stimulation step. However, the amount of solution used in each step must of course be sufficient to avoid the "electrolytic shock" referred to above.

During the concentration reduction step, it is the total ionic concentration of the solution which has to be carefully reduced to avoid the "electrolytic shock." The acid is the main contributor to the total ionic concentration, but other ionic species present, e.g. KCl, make a contribution to the total ionic concentration and must not be reduced in concentration too quickly. The concentration of non-ionic species which may be present is less significant, i.e. they are not likely to induce electrolytic shock if reduced in concentration too quickly, but for ease of operation the concentrations of all ingredients are generally reduced to the same extent during each ionic concentration reduction step. For this reason, the concentration of each of the essential ingredients, i.e. the acid, surfactant and clay stabilizing agent, should be sufficiently high at the start of the concentration reduction treatment that they are all present in their "threshold" amounts in the final concentration reduction step.

The "threshold" concentration can be determined for any particular rock formation by carrying out tests on core samples and flooding such samples with increasingly dilute treatment solutions. At a certain concentration, the yield of recovered hydrocarbon begins to fall off sharply, and the threshold concentration is the lowest concentration of the treatment solution before this takes place. Naturally, there is some flexibility in determining what exactly is the threshold concentration, so it should not be considered a precise concentration. The term can thus generally be interpreted as a low treatment fluid concentration approximating the lowest concentration at which the beneficial effects of the use of an acid/surfactant/clay stabilizing agent treatment solution are still substantial.

Once the threshold acid concentration has been reached during the concentration reduction step, the chemically modified waterflood is then continued as the low concentration treatment step by injecting further treatment fluid containing the threshold concentrations of acid, surfactant and clay stabilizing agent. This low concentration step is carried out immediately after the acidity reduction step and is preferably continuous therewith. The low concentration treatment step is continued until sufficient oil has been removed from the formation.

It is important to realize that although the pH of the fluids injected during the acidity reduction step to displace the acid stimulation fluids may be very low (pH 1–3), by the time that the final sequence of concentration reducing steps are implemented (to achieve the threshold concentration) the actual injected fluids may not necessarily be measurably acidic (pH less than 7) because of dilution effects.

Considerable flexibility exists in the formulation and manner of applying the treatment fluids employed for the gradual concentration reduction and continuous treatment phases of the invention. This flexibility is necessary because of the complexity of interactions between the individual components in these fluids and the manner in which the mixture interacts with the reservoir rock and reservoir fluids. In particular, the acid, surfactant and clay stabilizing agent employed should be ones which do not react unfavourably with reservoir components.

As noted above, the solutions used during the concentration reduction step and the low concentration treatment step contain at least one acid, and at least one surfactant and at least one clay stabilizing agent. The reasons for this are discussed below. However, it is believed that the effects of the acid, surfactant and clay stabilizing agent are synergistic and the presence of all three is required in the treatment solutions.

The inventor of the present invention has found that the viscosity of injected fluids can be varied substantially by adding both acid and surfactant to the fluids. It is believed that the acid reacts with carbonate or bicarbonate minerals present in the reservoir rock, reservoir fluids, or source waters used to dilute the acidic solutions during injection, to liberate carbon dioxide gas. This gas interacts with the surfactant present in the same acid mixture to form an in-situ foam. Since stable foams can have appreciable viscosity and the foam viscosity is proportional to the amount of gas present in the foam, then adjustment of the acid and/or surfactant concentration in the injected fluids can alter the effective viscosity of the injected fluids and thereby provide a mechanism for altering the mobility ratio and the quantity of hydrocarbons recovered. Consequently theory predicts that any acid that is capable of reacting with carbonate or bicarbonate minerals to produce carbon dioxide ($CO_2$) is operative within the scope of this invention. In actual practice the choice of acids is usually limited by economics to commercially available inorganic mineral acids such as hydrochloric, phosphoric, nitric, sulfuric or certain organic acids such as formic, acetic or citric or mixtures of mineral and organic acids.

Many different types of surfactants can be used with the described acids for in-situ foam generation. The primary criteria for selection of surfactants are that they must be compatible with the other additives in the acidic solution (i.e. remain in solution); they must be capable of forming high quality, stable foams; they should exhibit minimal absorption or reaction with the rock minerals in the reservoir; they should display good interfacial tension lowering properties and be inexpensive and readily available.

The amount of surfactant present in the treatment fluid in the continuous treatment step, i.e. the threshold concentration, is generally the minimum amount required to co-act with the acid to produce a favourable mobility ratio. This is normally 0.5% by weight or less, preferably 0.1% by weight or less, of the total weight of the treatment fluid. Such concentrations are substantially less than those employed for conventional waterflood techniques employing surfactants, thus making the method of the invention less costly than the known processes while resulting in a good yield of displaced hydrocarbon.

One method of evaluating the surfactants useful in this invention and their preferred concentrations is by preparing a dilute solution of the acidic fluids but without the surfactant, then adding the surfactant to the acidic fluid in various volumetric ratios to observe that the acid and surfactant form a true homogeneous solution and that the mixture is stable.

A 100 ml sample of the stable acidic fluid/surfactant solution may then be placed in a mechanical blender and a weighed portion of pulverized formation rock and reservoir oil added to the solution. The mixture is then stirred at high speed for 30 seconds to produce a foam. The blender is then stopped and the volume of foam is immediately recorded and the time measured for one-half (½) of the original solution to drain from the foam. Foam quality is then calculated as follows:

Foam Quality =

$$\frac{\text{vol. of foam} - \text{vol of acid/surfactant solution}}{\text{vol. of foam}} \times 100$$

A good quality, stable foaming surfactant can then be classified as providing a foam quality greater than 50% and foam half-life of greater than 1 (one) minute.

Using this screening method a number of surfactants have been found to be useful for this invention. It has also been determined that replacing approximately half of the amounts of the surfactant with common cosurfactants such as methanol or butyl cellusolve will function as well as undiluted surfactant.

While the following list of surfactants have been tested and found to be satisfactory, it is not intended that this list should be limiting. The list illustrates that suitable candidates can be found within the broad classifications of nonionic, anionic and cationic surfactants.

| Surfactant Type | Chemical Classifications | Typical Commercial Products |
| --- | --- | --- |
| Anionic | petroleum sulfonates<br>alkyl polyethoxlyated sulfonates<br>alpha olefinic sul fonates<br>Etbyl (R) AOS | Witco(R)TRS 10-80<br>Alipal(R) CD-128<br><br>$C_{14}$–$C_{16}$ |
| Nonionic | alkylphenoxypoly (ethyleneoxy) ethanols<br>$C_{10}$–$C_8$ amine oxides | Igepol(R) CO-630<br>Triton(R) X-100<br>Aromox (R) C/12<br>Varox (R) 191E |
| Cationics | polyethoxylated quaternary ammonium salts | Ethoquad(R) C/25 |

Another mechanism by which the surfactant operates in the invention is by a reduction of the interfacial forces between the reservoir rock and fluids contacting the rock. While this effect is well known, the impact that interfacial tension lowering exerts in the present invention is small compared to the in-situ foam effects. This is evident by the relatively high values of interfacial tensions exhibited by the acid/surfactant solutions of the invention (see the figures given in Example 3 and Example 4 below) in comparison to values in the range of about 0.01 to about 0.001 millinewtons/meter which the prior art teaches are required to cause efficient oil displacement in normal surfactant flooding schemes.

The ability of the complex acidic surfactant fluids to alter the effective permeability of the reservoir rock to the injected fluids may also play an important role in affecting mobility ratios. This is because the effective permeability, which is defined as the permeability of the rock to a particular fluid when only a portion of the rock is saturated with that fluid, changes as the treated, injected fluids reacts with the rock minerals to alter the saturation of the rock from a single (fluid only) phase to a complex gas/fluid phase. This condition may obscure or mask simultaneous changes in the absolute permeability (which is the permeability of a rock when fully saturated with a single phase fluid). In other words, the absolute permeability could be increasing as carbonate minerals dissolve, while at the same time the gas liberated forms an in-situ foam and actually decreases the effective permeability.

To understand this concept the following formula and definitions are required along with a knowledge of laboratory measurement techniques:

$$K_r = Ke/Ka \quad (2)$$

where
$K_r$ is the relative permeability
$Ke$ is the effective permeability
$Ka$ is the absolute permeability
and $$Ke = K_r K_q \text{ or } Ka = Ke/Kr$$

Therefore in conventional permeability measurement procedures the initial type of permeability being measured is actually absolute permeability because a single (brine) phase is normally flowed through the rock, however if the treated, injected fluid reacts with rock, the permeability measured becomes the effective permeability.

Evidence of this explanation can be demonstrated by comparing the absolute permeability of a rock formation before and after flowing a reactive fluid through it (e.g. see Example 5 given later).

Another important potential mechanism by which the present invention is believed to operate is by stabilizing hydratable or dispersable clays that are indigenous to many subterranean reservoirs. This stabilization is believed to be brought about by the acid in the treatment solution (which creates a high electrolyte environment), but in addition a clay stabilizer is used in the treatment solution in addition to the acid and the surfactant.

Clay stabilizing agents are materials which prevent or reduce the adverse effects of swelling clays in subterranean formations.

It has been found that highly ionizable inorganic salts, such as KCl and NH$_4$Cl, act as clay stabilizing agents in the method of the present invention, as well as conventional organic clay stabilizing agents. Clay stabilizing agents have generally been used in the past for near wellbore applications, i.e. for stabilizing the rock formation immediately adjacent to a well (see, for example, U.S. Pat. No. 4,366,071 issued on Dec. 28, 1982 to McLaughlin et al, the disclosure of which is incorporated herein by reference) but inorganic clay stabilizers were believed to be inferior because their effect was not found to be permanent (see column 2, lines 60–69 of the above patent). In the method of the present invention, however, these inorganic stabilizers unexpectedly prove very effective, perhaps because the clays are continuously contacted by fresh inorganic stabilizer in the treatment solutions.

An organic clay stabilizing agent may be used in place of, or in addition to KCl or NH$_4$Cl mentioned above. Examples of such agents include low molecular weight cyclic imides, polyquaternary ammonium polymers of about 500,000 molecular weight and the organic polycationic polymer compositions disclosed in U.S. Pat. No. 4,366,071 mentioned above.

The "threshold" amount of the clay stabilizing agent is simply the minimum amount required, in co-operation with the acid solution, to prevent substantial reductions of permability due to clay swelling or similar effects.

To facilitate the operation of the inventive process, a concentrated formulation of the treatment solution ingredients may be prepared and this may be diluted to the desired extent with available flood water immediately prior to carrying out the invention.

When such concentrated formulations are employed, at least one corrosion inhibitor must generally be present to reduce the corrosion of surface equipment used to handle the concentrated acidic solutions prior to dilution. Suitable corrosion inhibitors are well known in the art, as shown by the Society of Petroleum Engineer's monograph volume 6, entitled "Acidizing Fundamentals" by B. B. Williams, J. L. Gidley and R. S. Schechter, the disclosure of which is incorporated herein by reference.

Other optional additives may be employed, e.g. scale preventers and sequesterants. Scale preventers inhibit the formation of mineral scale normally caused by reaction of the injected fluids with incompatible reservoir fluids. Sequesterants may be used to prevent undesirable effects of certain metal ions. Such additives are well known to persons skilled in the art, and their use depends on the potential for incompatability between injection waters and formation waters.

By way of example, several useful concentrated formulations are described in Table 1 below. It is not intended that the present inventon be limited to these formulations. However it will be obvious from this description that some of the synergistic mechanisms by which these formulations operate do permit a certain degree of predictability in suggesting other potentially operative formulations based on the mechanisms proposed. For example, it is believed that this invention provides a novel means of manipulating the mobility ratio between the displacing (injected) fluids and the hydrocarbon phase being displaced by way of chemically inducing alterations in the viscosity and permeability terms of the mobility ratio equation (1) presented earlier.

TABLE 1

EXAMPLES OF USEFUL TREATMENT LIQUID FORMULATIONS FOR USE WITH THE CONCENTRATION REDUCTION AND LOW CONCENTRATION TREATMENT STEPS OF THE INVENTION AFTER SUITABLE DILUTION

| Chemicals Present & Function | % by Weight of Chemicals in Solutions | | | | | |
|---|---|---|---|---|---|---|
| | Formulation 1 | Formulation 2 | Formulation 3 | Formulation 4 | Formulation 5 | Formulation 6 |
| 98% Glacial Acetic Acid | — | — | — | 5.8 | 3.5 | — |
| 75% H$_3$PO$_4$ | 53.61 | 28.43 | — | — | 29.2 | 79.26 |
| 30% HCl | — | — | 23.13 | 30.4 | — | — |
| TCH-CAT (Clay Stabilizer) | 3.00 | 1.66 | 1.32 | 1.8 | 1.7 | 4.55 |
| Calgon WT 2271 (Clay stabilizer) | — | — | 0.58 | — | — | — |
| Dequest 2010 (Scale Preventer) | 1.37 | 1.00 | 0.79 | 1.0 | 1.3 | 2.74 |
| Tretolite AK-7 (Corrosion inhibitor) | — | 0.15 | — | — | — | 0.40 |
| Tretolite AK-12 (Corrosion inhibitor) | — | — | 0.15 | 0.2 | — | — |
| KI (Corrosion inhibitor) | — | 0.08 | — | — | — | 0.20 |
| Proparyl alcohol (Corrosion inhibitor) | — | 0.11 | — | — | — | 0.30 |
| Thiourea (Corrosion inhibitor) | — | 0.01 | — | — | — | 0.04 |
| Penzone E (Corrosion inhibitor) | 0.78 | — | — | — | 0.4 | — |
| Igepol CO-630 (surfactant) | — | 15.90 | 15.00 | — | — | 1.01 |

TABLE 1-continued

| | | | | | | |
|---|---|---|---|---|---|---|
| Alipal CD-128 (surfactant) | — | — | — | — | 14.4 | — |
| Varox 191E (surfactant) | 41.24 | — | — | 2.0 | — | — |
| Ethoquad C/25 (surfactant) | — | — | — | 8.0 | — | — |
| Butyl Cellusolve (cosurfactant) | — | — | — | 10.0 | — | — |
| Methanol (cosurfactant) | — | — | — | — | 5.2 | — |
| Water | — | 51.90 | 58.97 | 40.8 | 44.3 | 11.50 |
| TOTALS | 100% | 100% | 100% | 100% | 100% | 100% |

Notes: A description of the registered trade mark products described above is presented in Table 1 - Part 2.

TRADE MARK PRODUCTS

| Product Name | Chemical Description | Manufacturer |
|---|---|---|
| TCH-CAT | low mol. wt. cyclic imide which is the reaction product of a citric acid monoethanolamine elimination reaction ($C_{10}N_2O_6H_{15}$, molecular weight 259) | Amerigo |
| Calgon WT 2271 | a liquid, water-soluble cationic polyelectrolyte containing a polyquaternary ammonium polymer of approx. 500,000 polymer mol. wt. (polydimethyldiallyl polyquaternary ammonium salt) | Calgon |
| Dequest 2010 | 60% hydroxyethylidene diphosphonic acid (1-hydroxyethylidene-1,1-diphosphonic acid) | Monsanto |
| Tretolite AK-7 | proprietory solution of polyquaternary amines, thiourea nonionic surfactants & water (for use in $H_3PO_4$ or organic acids). The company describes the product as a blend of quaternary ammonium salts, a thioamide and oxyalkylated phenols in an aqueous alcohol solvent system. | Tretolite |
| Tretolite AK-12 | similar to AK-7 but also contains acetylenic alcohols (for use in HCl or HCl/HF acids). The company describes the product as a blend of quaternary ammonium compounds,m acetylenic alcohols, amide and oxyalkylated phenols in an aqueous alcohol solvent system. | Tretolite |
| Penzone E | N,N≡—diethylthiourea | Penwalt |
| Igepol CO-630 | alkylphenyoxypoly(ethyleneoxy) ethanols | GAF Corp. |
| Alipal CD-128 (Fenopon CD-128) | approx. 60% active ammonium salt of alkyl polyethoxylated sulfonate in 14% ethanol & 22% water | GAF Corp. |
| Varox 191E | 40% active $C_9$-$C_{11}$ alkyl 2-hydroxyethyl amine oxide | Sherex |
| Ethoquad C/25 | 95% active methylpolyoxyethylene(15) cocoammonium chloride | Armour |

It should be noted that the formulations given in Table 1 demonstrate particularly good clay stabilization properties, but the addition of KCl or $NH_4Cl$ as additional clay stabilizing agents may be necessary or desirable for certain rock formations.

From Table 1 it can be seen that suitable formulations contain about 20 to 80% by weight of a strong acid, 1 to 45% by weight of surfactant, 0.1 to 10% by weight of a clay stabilizing agnet, up to about 5% by weight of a corrosion inhibitor, up to about 5% by weight of a scale preventer and up to about 15% by weight of a cosurfactant.

The following examples (except for Example 1 which is provided for comparison) demonstrate the novel method of this invention and illustrate how the formulations described in Table 1 function in a synergistic manner to improve the recovery of oil beyond that obtainable by conventional waterflooding. In these Examples, a number of laboratory simulated waterfloods and chemically-modified waterfloods of the kind described by this invention, were conducted on core samples taken from several oil-bearing formations in Western Canada and the Berea Formation of the United States of America. A core permeameter apparatus was utilized and, in each case, synthetic or actual formation brines were initially flowed through the cores to saturate the cores with brine, then formation oil was flowed through the cores to establish oil and brine saturation levels that were representative of the natural oil-bearing formations.

EXAMPLE 1 (for comparison)

A core sample from a Cardium A sandstone formation was saturated with synthetic formation brine and crude oil to achieve an initial oil saturation of 80.8% of available pore space.

Pembina River water was then flowed through the core to simulate a waterflood procedure that was actually being practiced in the oil field. Oil recovery in the laboratory test using the normal waterflooding procedure yielded only 10.5% recovery of the original oil in place. When an acidic surfactant solution according to the invention was flowed through the same core, i.e., the one previously waterflooded, a further 26.3% of the original oil in place was recovered. This improved oil recovery was partly attributed to improved mobility caused by in-situ foam generation brought about by reaction of the injected complex acidic/surfactant solution with siderite (ferrous carbonate) minerals indigenous to the Cardium core.

Full details are provided in Table 2 below.

This Example provides an indication of the type of results that can be expected when fairly concentrated treatment solutions are employed without a concentration reduction step. The following Examples show that similar results can be achieved at much lower concentrations (i.e. the "threshold" concentrations) when concentration reduction steps are carried out with a consequent substantial saving in material costs.

TABLE 2

EXAMPLE #1 - LABORATORY SIMULATED WATERFLOODS USING CARDIUM A SANDSTONE CORE

| FLUIDS | FLUID SATURATIONS BEFORE FLOOD (% Pore Space) | | FLUID SATURATIONS AFTER FLOOD (% Pore Space) | | OIL RECOVERY % Original Oil In Place | INCREMENTAL OIL (Relative to Waterflooding) |
|---|---|---|---|---|---|---|
| | Brine | Oil | Brine | Oil | | |
| 1. Simulated Waterflood 10 pore volumes (PV) of Pembina River Water | 19.2% | 80.8% | 27.7% | 72.3% | 10.5% | — |
| 2. Modified Waterflood 10 PV of a 25% solution | 27.7% | 72.3% | 38.3% | 61.7% | 36.8% | +250.5% |

TABLE 2-continued
EXAMPLE #1 - LABORATORY SIMULATED WATERFLOODS USING CARDIUM A SANDSTONE CORE

| FLUIDS | FLUID SATURATIONS BEFORE FLOOD (% Pore Space) | | FLUID SATURATIONS AFTER FLOOD (% Pore Space) | | OIL RECOVERY % Original Oil In Place | INCREMENTAL OIL (Relative to Waterflooding) |
|---|---|---|---|---|---|---|
| | Brine | Oil | Brine | Oil | | |
| of Formulation 6 - Table 1 | | | | | | |

EXAMPLE 2

Three separate core samples were cut from a larger diameter core section of homogenous Berea sandstone and saturated first with brine and then crude oil to achieve initial oil saturations ranging from 61.4% to 64.9% of the available pore volume. One core sample was subjected to a simulated conventional water flood treatment using 1% NaCl brine. A second core was subjected to a modified waterflood in which the 1% NaCl had been treated with 500 milligrams per liter of an acidic surfactant solution. The third core was initially subjected to a stimulation treatment with an aqueous solution that contained hydrofluoric acid as well as another mineral acid ($H_3PO_4$) so as to improve the permeability of the core. The stimulation fluids were displaced from the core with a progressively reducing concentration of an acidic surfactant solution until the concentration of the solution was equivalent to 500 milligrams per liter in the 1% NaCl solution and then maintained at this concentration throughout the duration of the modified waterflood procedure.

The details are given in Table 3 below and it can be seen from the results in the Table that both modified waterflooding procedures yielded improved oil recoveries over and above that achieved by the normal waterflooding procedure. This improved oil recovery is apparently due to in-situ foam generation caused by reaction of the injected complex acid/surfactant solutions with carbonate minerals contained in the Berea cores and by stabilization of clay fines in these cores.

TABLE 3
EXAMPLE #2 - LABORATORY SIMULATED WATERFLOODS USING BEREA SANDSTONE CORES

| FLUIDS | FLUID SATURATIONS BEFORE FLOOD (% Pore Space) | | FLUID SATURATIONS AFTER FLOOD (% Pore Space) | | OIL RECOVERY % Original Oil In Place | INCREMENTAL OIL (Relative to Waterflooding) |
|---|---|---|---|---|---|---|
| | Brine | Oil | Brine | Oil | | |
| 1. Simulated Waterflood 20 PV (pore volumes) of 1% NaCl brine | 38.7% | 62.0% | 68.7% | 31.3% | 49.6% | — |
| 2. Modified Waterflood 20 PV of a 1% NaCl brine containing 500 ppm of Formulation 6 - Table 1 | 35.1% | 64.9% | 69.7% | 30.3% | 53.3% | +7.4% |
| 3. Modified Waterflood | 38.6% | 61.4% | | | | |
| (a) 1 PV of 250,000 ppm of solution of Formulation 6-Table 2 + 30,000 ppm HF* | | | | | | |
| (b) 1 PV of 100,000 ppm solution of Formulation 6-Table 1 in 1% NaCl | | | | | | |
| (c) 1 PV of 50,000 ppm solution of Formulation 6-Table 1 in 1% NaCl | | | | | | |
| (d) 1 PV of 10,000 ppm solution of Formulation 6-Table 1 in 1% NaCl | | | | | | |
| (e) 1 PV of 5,000 ppm solution of Formulation 6-Table 1 in 1% NaCl | | | | | | |
| (f) 1 PV of 1,000 ppm solution of Formulation 6-Table 1 in 1% NaCl | | | | | | |
| (g) 4 PV of 500 ppm solution of Formulation 6-Table 1 in 1% NaCl | | | 78.3% | 21.7% | 64.6% | +30.2% |

*Preliminary stimulation treatment.

EXAMPLE 3

Five core plugs were taken from a 1-foot interval of a larger diameter core recovered from the Viking Formation of west-central Saskatchewan and saturated with highly saline formation brine and then with oil to achieve initial oil saturations of 50.7 to 55.9% of the available pore volumes. One core was then subjected to a simulated waterflood using actual filtered formation water from the Deadwood formation. This source of formation water is currently being injected into a number of wells in the oilfield where the core samples were taken from and is considered to be the most suitable source water available because of its high salinity. A second core was subjected to a simulated waterflood using filtered Bakken formation waters with 0.5% KCl added to increase the salinity. A third core was subjected to a simulated, modified waterflood of the type described in the invention which included an initial acid stimulation employing a $H_3PO_4$ and HF acid mixture, a gradually reducing concentration of an acidic surfactant fluid (Formulation 6 - Table 1) diluted in filtered Viking formation until a 500 ppm concentration was achieved, and then this 500 ppm concentration was maintained throughout the duration of the modified waterflood procedure. A fourth core was subjected to a modified waterflood procedure in which the same filtered Bakken formation water with 0.5% KCl was treated with a progressively decreasing concentration of an acid/surfactant fluid of the type described by Formulation 2, Table 1. When a concentration equivalent to 2000 ppm of the fluid in the Bakken water/KCl brine was attained, this concentration was maintained throughout the duration of the simulated modified waterflood procedure. A fifth core was subjected to a modified waterflood using Bakken formation water without KCl added; the same acid concentration reduction process was followed as that of test no. 4 using the same acidic surfactant solution (Formulation 2 - Table 1).

In both completed cases of the modified waterfloods the total amounts of oil ultimately produced were higher than those of the normal waterfloods employing either the Deadwood formation water or the Bakken formation water with KCl added. Even more significant are the higher portions of the total oil that were recovered at "breakthrough" (that point at which aqueous displacement fluids first show up in the produced fluids - see $N_{pbt}$ values). This indicates that the chemically-modified waterfloods of the type described by this invention have lowered the mobility ratios between the displacing (injected) and (produced) oil phases to give improved volumetric sweep efficiencies.

The primary mechanism for mobility control in these tests is apparently caused by in-situ foam generation when the complex acidic solutions are diluted with Viking and Bakken formation waters which contain significant concentrations of dissolved bicarbonate.

The fourth and fifth core tests demonstrated that the KCl and clay stabilizer components in the acidic surfactant solution must function synergistically to prevent permeability loss. Failure to recognize this important factor can severely limit the amount of oil recovered.

TABLE 4

| | SUMMARY OF LABORATORY TESTS VIKING FORMATION SASKATCHEWAN | | | | | | | |
|---|---|---|---|---|---|---|---|---|
| CORE TEST | | Interfacial Tension | Initial Fluid Saturations In Core (% PV) | | Final Fluid Saturations In Core (% PV) | | Oil Recovery (% OOIP) | |
| No. | FLUID SYSTEM USED | (mN/m) | $S_{wi}$ | $S_{oi}$ | $S_{wr}$ | $S_{or}$ | $N_{pbt}$ | $N_f$ |
| 1. | Deadwood Formation Water | 8.15 | 47.0 | 53.0 | 68.6 | 31.4 | 11.6 | 40.7 |
| 2. | Bakken Formation water + 0.5% KCL | 3.20 | 44.1 | 55.9 | 51.3 | 48.7 | 6.4 | 12.8 |
| 3. | Viking Formation water (dilutant) | | | | | | | |
| Step 1 | 1 PV Stimulation-25% sol'n of Formulation 6 - Table 1 + 3% HF | 0.34 | 49.3 | 50.7 | — | — | — | — |
| Step 2 | 0.1 PV of 100,000 ppm of Formulation 6-Table 1 | | | | | | | |
| | 0.1 PV of 50,000 ppm of Formulation 6-Table 1 | | | | | | | |
| | 0.1 PV of 20,000 ppm of Formulation 6-Table 1 | | | | | | | |
| | 0.1 PV of 10,000 ppm of Formulation 6-Table 1 | | | | | | | |
| | 0.1 PV of 5,000 ppm of Formulation 6-Table 1 | | | | | | | |
| | 0.1 PV of 2,000 ppm of Formulation 6-Table 1 | | | | | | | |
| | 0.1 PV of 1,000 ppm of Formulation 6-Table 1 | | | | | | | |
| Step 3 | Continuous 500 ppm of Formulation 6-Table 1 | 10.6 | — | — | 89.8 | 10.2 | 71.6 | 79.8 |
| 4. | Bakken Formation water + 0.5% KCl (dilutant) | | | | | | | |
| Step 2 | 0.1 PV of 250,000 ppm of Formulation 2-Table 1 | 0.16 | 46.2 | 53.8 | — | — | — | — |
| | 0.1 PV of 100,000 ppm of Formulation 2-Table 1 | | | | | | | |
| | 0.1 PV of 50,000 ppm of Formulation 2-Table 1 | | | | | | | |
| | 0.1 PV of 20,000 ppm of Formulation 2-Table 1 | | | | | | | |
| | 0.1 PV of 10,000 ppm of Formulation 2-Table 1 | | | | | | | |
| | 0.1 PV of 5,000 ppm of Formulation 2-Table 1 | | | | | | | |
| | 0.1 PV of 2,000 ppm of Formulation 2-Table 1 | | | | | | | |
| Step 3 | Continuous 2,000 ppm of Formulation 2-Table 1 | 0.36 | — | — | 72.5 | 27.5 | 46.3 | 48.8 |
| 5. | Bakken Formation water (dilutant) | | | | | | | |
| | 0.1 PV of 250,000 ppm of Formulation 2-Table 1 | 0.28 | 47.8 | 52.2 | — | — | — | — |
| | 0.1 PV of 100,000 ppm of Formulation 2-Table 1 | | | | | | | |
| | 0.1 PV of 50,000 ppm of Formulation 2-Table 1 | | | | | | | |
| | 0.1 PV of 20,000 ppm of Formulation 2-Table 1 | | | | | | | |
| | 0.1 PV of 10,000 ppm of Formulation 2-Table 1 | | | | | | | |
| | 0.1 PV of 5,000 ppm of Formulation 2-Table 1 | | | | | | | |
| | 0.1 PV of 2,000 ppm of Formulation 2-Table 1 | | | | | | | |
| Step 3 | Continuous 2,000 ppm of Formulation 2-Table 1 | (Loss of core permeability during start of the continuous treatment step necessitated abortion of test as injection pressures became extreme. This shows the effectiveness of KCl as a clay stabilizer - cf core test no. 4). | | | | | | |

Legend:
PV — por volumes of core
mN/m — millinewtons/meter
OOIP — original oil in place
$S_{wi}$ — initial water saturation in core prior to flood
$S_{oi}$ — initial oil saturation in core prior to flood
$S_{wr}$ — final water saturation in core after flood
$S_{or}$ — final oil saturation in core after flood
$N_{pbt}$ — cumulative oil produced at breakthrough
$N_f$ — total (ultimate) oil produced after exhaustive flooding

EXAMPLE 4

Four smaller core plugs were cut from a 1-foot interval of a larger diameter section of core recovered from the Doe Creek formation of Alberta. Samples of Doe Creek formation brine and produced oil were flowed through the cores separately to establish the initial fluid saturations shown in Table 5. As indicated the initial oil saturations ranged from 83.0 to 98.0% of the available pore space of the cores.

A simulated waterflood was implemented with one core using filtered Cardium formation water to evaluate the suitability of this water (brine) for potential field use. A second core was subjected to a chemically-modified waterflood employing a stimulation treatment with an acidic surfactant fluid containing $H_3PO_4$ and HF, followed by a concentration reduction process in which an acidic surfactant fluid (Formulation 6 - Table 1) was sequentially diluted with filtered Cardium formation water until a final concentration of 500 ppm of the acidic surfactant fluid was attained, and then this 500 ppm treatment was maintained throughout the duration of the simulated, modified waterflood. A third core was subjected to a simulated, chemically-modified waterflood in which the stimulation step was omitted. An acidic surfactant fluid (Formulation 2 of Table 1) was diluted with filtered Cardium formation water in a simple 2-stage concentration reduction procedure until a 500 ppm concentration was attained and thereafter maintained at this concentration for the duration of the chemically modified waterflood. The fourth core was also subjected to a simulated, chemically-modified waterflood similar to that involving the third core except that a different acidic surfactant fluid (Formulation 3 - Table 1) was utilized for the concentration reduction and continuous treatment procedures.

As is evident from the data on Table 5 the simulated, chemically-modified waterfloods recovered substantially more oil than the simulated normal waterflood. This incremental recovery of oil is partly attributed to reductions of mobility ratios that occurred when the acidic surfactant fluids reacted with carbonate minerals that were found to be present in the core samples (by X-Ray diffractive analysis).

TABLE 5

SUMMARY OF LABORATORY TESTS - DOE CREEK FORMATION - ALBERTA

| CORE TEST # | FLUID SYSTEM USED | Interfacial Tension (mN/m) | Initial Fluid Saturations In Core (% PV) | | Final Fluid Saturations In Core (% PV) | | Oil Recovery (% OOIP) | |
|---|---|---|---|---|---|---|---|---|
| | | | $S_{wi}$ | $S_{oi}$ | $S_{wr}$ | $S_{or}$ | $N_{pbt}$ | $N_f$ |
| 1. | Cardium Formation Water | — | 10.7 | 89.3 | 73.9 | 26.1 | 9.3 | 29.2 |
| 2. | Cardium Formation water (dilutant) | | | | | | | |
| Step 1 | Stimulation - 1 PV of 25% solution of Formulation 6-Table 1 + 3% HF | | | | | | | |
| Step 2 | Concentration Reduction Procedure | | | | | | | |
| | 0.1 PV of 250,000 ppm of Formulation 6-Table 1 | 0.33 | 2.0 | 98.0 | — | — | — | — |
| | 0.1 PV of 100,000 ppm of Formulation 6-Table 1 | | | | | | | |
| | 0.1 PV of 50,000 ppm of Formulation 6-Table 1 | | | | | | | |
| | 0.1 PV of 20,000 ppm of Formulation 6-Table 1 | | | | | | | |
| | 0.1 PV of 10,000 ppm of Formulation 6-Table 1 | | | | | | | |
| | 0.1 PV of 5,000 ppm of Formulation 6-Table 1 | | | | | | | |
| | 0.1 PV of 2,000 ppm of Formulation 6-Table 1 | | | | | | | |
| | 0.1 PV of 500 ppm of Formulation 6-Table 1 | | | | | | | |
| Step 3 | Continuous treatment procedure @ 500 ppm of Formulation 6 - Table 1 | | | | 57.4 | 42.6 | 24.6 | 43.5 |
| 3. | Cardium formation water (dilutant) | | | | | | | |
| Step 2 | Concentration Reduction Procedure | | | | | | | |
| | 0.5 PV of 1,000 ppm of Formulation 2-Table 1 | 0.32 | 10.3 | 89.7 | | | | |
| | 0.5 PV of 500 ppm of Formulation 2-Table 1 | | | | | | | |
| Step 3 | Continuous treatment procedure @ 500 ppm of Formulation 2-Table 1 | | | | 64.4 | 35.6 | 22.6 | 39.7 |
| 4. | Cardium Formation Water (dilutant) | | | | | | | |
| Step 2 | Concentration Reduction Procedure | | | | | | | |
| | 0.5 PV of 1,000 ppm of Formulation 3-Table 1 | 0.38 | 17.0 | 83.0 | | | | |
| | 0.5 PV of 500 ppm of Formulation 3-Table 1 | | | | | | | |
| Step 3 | Continuous treatment procedure @ 500 ppm of Formulation 3-Table 1 | | | | 63.1 | 36.9 | 25.6 | 44.6 |

Legend:
PV — pore volumes of core
mN/m — millinewtons/meter
OOIP — original oil in place
$S_{wi}$ — initial water saturation in core prior to flood
$S_{oi}$ — initial oil saturation in core prior to flood
$S_{wr}$ — final water saturation in core after flood
$S_{or}$ — final oil saturation in core after flood
$N_{pbt}$ — cumulative oil produced at breakthrough
$N_f$ — total (ultimate) oil produced after exhaustive flooding

EXAMPLE 5

To demonstrate that the absolute permeability of a rock core sample can vary during treatment with a reactive injection water, a core permeameter test was undertaken. In this procedure, Darcy's Law is utilized to calculate permeability from measured pressure values from Darcy's Law which states:

$$\frac{Q}{A} = \frac{K(\Delta P)}{\mu L}$$

where:
Q = volumetric flow rate (cubic centimeters per second) through core
A = cross sectional area of the core (square centimeter)

ΔP = pressure drop across the core (atmospheres)
μ = viscosity of fluids (centipoises)
L = length of core (centimeters)
K = permeability of core (darcies) or $$\Delta P = \frac{QL}{AK} \cdot \mu$$

Therefore by knowing the core dimensions accurately, controlling Q and measuring ΔP across the core the permeability of K can be calculated if μ is known. Normally K is determined by flowing a single fluid phase through the core. If the injected fluid reacts with the core minerals to provide a foam in-situ the μ term will change and obscure the true value of absolute permeability that was originally measured. To avoid this problem the absolute permeability of the core must be measured by flowing an unreactive fluid through the same core before and after injection of a reactive fluid.

Using a core sample from a Jurassic, North Sea reservoir which was determined by X-Ray diffractive analysis to contain 10–15% by bulk weight calcium carbonate as part of the rock matrix, a non-reactive reference brine (4% $NH_4Cl$) was flowed through the core at 1.00 milliliters/min and the ΔP across the core was measured after steady state conditions were established. Fluids containing an acid/surfactant fluid (Formulation 6 - Table 1) were then flowed through the core, and finally more of the original 4% $NH_4Cl$ solution was again flowed through the core. Permeabilities were then calculated as per Table 6 attached. It is evident that absolute permeability of the core to 4% $NH_4Cl$ sbrine did change appreciably as a result of injection of the acidic surfactant fluids.

I claim:

1. A method of recovering hydrocarbons from an argillaceous subterranean rock formation by a modified waterflood technique involving injecting an aqueous solution into an input well drilled into the formation and recovering oil displaced by said solution from at least one production well drilled into said formation, wherein the method comprises:
   increasing the permeability of the formation adjacent to the input well by injecting a strongly acidic aqueous solution into the formation;
   displacing said strongly acidic solution into the formation by injecting an aqueous acidic surfactant treatment solution containing a clay stabilizing agent into the formation through said input well, said treatment solution initially injected having a total ionic concentration approaching that of said acidic aqueous solution but the concentration of said treatment solution being gradually reduced as more of said treatment solution is injected until a threshold concentration is reached, said threshold concentration being substantially the lowest concentration of the acid, surfactant and clay stabilizing agent capable of maintaining acceptable permeability of the formation and a mobility ratio between the treatment solution and hydrocarbons displaced from the formation of about 1.0 or less; and
   continuing the injection of said treatment solution having said threshold concentration in order to displace hydrocarbons from the formation.

2. A method according to claim 1 wherein the treatment solution initially injected into said formation has a total ionic concentration at least 20% as high as that of the strongly acidic aqueous solution used for increasing the permeability of the formation.

3. A method according to claim 2 wherein the concentration of the treatment solution is gradually reduced in a stepwise manner and wherein the concentration of the treatment used in each step is about one fifth to one half that of the solution used in the immediately preceding step.

4. A method according to claim 1 wherein the reduction of concentration of the treatment solution is sufficiently gradual that the increased permeability achieved by the injection of the strongly acidic solution is not substantially reduced.

5. A method according to claim 1 wherein the treatment solution contains one or more acids capable of reacting with carbonate or bicarbonate to generate carbon dioxide.

6. A method according to claim 1 wherein the treatment solution contains one or more acids selected from the group consisting of hydrochloric, phosphoric, nitric, sulfuric, formic, acetic and citric.

7. A method according to claim 1 wherein the treatment solution contains one or more surfactants selected from the group consisting of petroleum sulfonates, alkyl polyethoxylated sulfonates, alpha olefinic sulfonates, alkylphenoxypolyethanols, $C_{10}$ to $C_{18}$ amine oxides and polyethoxylated quaternary ammonium salts.

8. A method according to claim 7 wherein the treatment solution also contains a co-surfactant selected from the group consisting of methanol and butyl cellusolve.

9. A method according to claim 1 wherein the clay stabilizing agent is a highly ionizable inorganic salt.

10. A method according to claim 9 wherein the salt is selected from KCl and $NH_4Cl$.

11. A method according to claim 1 wherein the clay stabilizing agent is an organic material.

12. A method according to claim 11 wherein the organic material is selected from the group consisting of low molecular weight cyclic imides, poly quaternary ammonium polymers of about 500,000 molecular weight and organic poly cationic polymers.

13. A method according to claim 1 wherein the strongly acidic aqueous solution has a pH in the range of 1 to 3.

14. A method according to claim 1 wherein the strongly acidic aqueous solution has a pH in the range of 1 to 2.

15. A method according to claim 1 wherein the strongly acidic aqueous solution contains one or more acids selected from the group consisting of phosphoric, hydrochloric, formic and acetic.

16. A method according to claim 1 wherein said treatment solution contains at least one corrosion inhibitor.

17. A method according to claim 1 wherein said treatment solution contains at least one sequesterant.

18. A method according to claim 1 wherein the treatment solution is prepared for use prior to its injection into the formation by adding a concentrated formulation to water from a source readily available at the input well, and wherein the concentration of the treatment solution is gradually reduced by reducing the amount of said formulation added to said water.

19. A method of recovering hydrocarbons from an argillaceous subterranean rock formation of suitably high permeability by a waterflood technique involving injecting an aqueous solution into an input well drilled into the formation and recovering oil displaced by said solution from at least one production well drilled into said formation, wherein the method comprises:

injecting an aqueous acidic surfactant treatment solution containing a clay stabilizing agent into said formation through said input well, the treatment solution initially injected being strongly acidic but the concentration of said acidic treatment solution being gradually reduced as more of said acidic treatment solution is injected until a threshold concentration is reached, said threshold concentration being substantially the lowest concentration of acid, surfactant and clay stabilizing agent capable of maintaining acceptable permeability and a mobility ratio between the acidic surfactant solution and hydrocarbons displaced from the formation of about 1.0 or less; and then continuing the injection of said treatment solution having said threshold concentration in order to displace hydrocarbons from the formations.

* * * * *